United States Patent

Jadhav et al.

Patent Number: 5,820,992
Date of Patent: Oct. 13, 1998

[54] SILICON CONTAINING POLYARYLATES

[75] Inventors: Arun Savalaram Jadhav; Jayarani Purushotham; Sudhir Sharad Chandra Kulkarni; Subhash Pundlik Vernekar, all of Maharashtra, India

[73] Assignee: National Chemical Laboratory, Maharashtra, India

[21] Appl. No.: 723,498

[22] Filed: Sep. 30, 1996

Related U.S. Application Data

[62] Division of Ser. No. 383,512, Feb. 6, 1995.

[51] Int. Cl.⁶ ............... B32B 9/00; B01D 53/22
[52] U.S. Cl. ............... 428/447; 95/45; 95/47; 95/51; 95/53; 95/54; 96/13; 96/14
[58] Field of Search ............... 428/447; 95/45, 95/47, 51, 53, 54; 96/13, 14

[56] References Cited

U.S. PATENT DOCUMENTS

| | | | |
|---|---|---|---|
| 3,874,986 | 4/1975 | Browall et al. | |
| 4,243,701 | 1/1981 | Riley et al. | 427/244 |
| 4,608,060 | 8/1986 | Kulprathipanja | 55/16 |

Primary Examiner—Margaret W. Glass
Attorney, Agent, or Firm—Renner, Otto, Boisselle & Sklar

[57] ABSTRACT

The present invention provides a process for preparing membranes using novel silicon containing polyarylates of Formula I

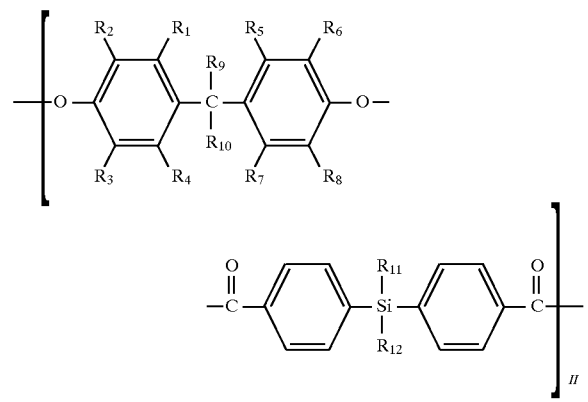

where $R_1$ to $R_8$ represent hydrogen, alkyl groups containing 1 to 5 methylene group or halogen atoms, $R_9$ and $R_{10}$ represents alkyl groups containing 1 to 5 carbon atoms or $CF_3$ group and $R_{11}$ and $R_{12}$ represent alkyl groups with 1 to 5 carbon atoms or phenyl groups.

10 Claims, 1 Drawing Sheet

SILICON CONTAINING POLYARYLATES

This is a division of copending application Ser. No. 08/383,512, filed Feb. 6, 1995.

The present invention relates to a novel silicon-containing aromatic polyesters and synthesis of this new class of silicon-containing aromatic polyesters, which have superior permeation properties; thus being highly useful for separation of gases. These aromatic polyesters are made by reacting various bisphenols with bis(chlorocarbonyl phenyl) disubstituted silanes.

Aromatic polyesters are high performance engineering plastics with a good combination of thermal, mechanical and permeation properties. They are not currently used commercially for fabricating membranes; however the use of particular aromatic polyester is taught in U.S. Pat. No. 3,899,309 dated Aug. 12, 1975 to Hoehn and Richter, assigned to EI Du Pont de Nemours and Co. This patent covers gas separation membranes made from polyimides, polyesters and polyamides in which the main chain repeating unit has at least one rigid subunit with nonlinear bond connections, is sterically unable to rotate 360° around at least one of these bonds and has at least 50% of its main chain atoms as members of aromatic rings.

The beneficial effects of substitution on the main chain aromatic rings of various classes of polymers have been identified in the literature as typified in two examples below:

U.S. Pat. No. 4,840,686 (J N Anand, S E Bales, D C Feay and T O Jeanner, 1989, to Dow Chemical Co.) teaches the use of polycarbonate made from tetrabromobisphenol A and phosgene. This polymer gave a permeation selectivity for $O_2$ over $N_2$ of 7.4 ($\alpha=O_2/N_2$ $\alpha=7.4$). U.S. Pat. No. 4,717,394 (R A Hayes, 5.1.1988 to Du Pont de Nemours) teaches the use of polyimides formed from dianhydrides and diamines with alkyl substitution on all ortho positions. The $=O_2/N_2$ was 3.5 and the substituted polymer had improved environmental stability.

Various patents teach the use of silicon containing polymers as a material for gas separation membranes. The high permeability of dimethyl siloxane is well known and the use of this material to form a thin film composite membrane is taught in U.S. Pat. No. 4,243,701 dt 6.11.1981 to R L Riley and R L Grabowsky assigned to UOP Inc. A blend membrane of dimethyl siloxane with polyethylene glycol is taught in U.S. Pat. No. 4,608,060 (S Kulprathipanja and S S Kulkarni, 26 Aug. 1986 to UOP Inc.). Membranes formed from copolymers of dimethyl siloxane with polycarbonate (U.S. Pat. No. 3,874,986, W R Browall, R M Salemme, 1.4.1979 to General Electric Co. and USSR 550407 to V D Sheludyakov et al 15.3.1977) and of dimethyl siloxane with polyurethane (Jpn Kokai Tokkyo Koho JP 58/163403 A2 to Nitto Electric Co. dt 26.9.83) are also known. Isocyanates can be reacted with amino terminated siloxanes (Jpn Kokai Tokkyo Koho JP 58/193701 A2 to Teijin Ltd dt 11.11.83) or with hydroxyl terminated siloxanes (Jpn Kokai Tokkyo Koho JP 58/163402 to Nitto Electric Ind Co. dt. 28.9.83) and the resulting polymers used as membranes. Polysilylene based membranes can be made by heating the appropriate dichlorosilanes in the presence of sodium (Jpn Kokai Tokyo JP 58/55004 A2 to Mitusubishi Chemical Industries Co. dt 1.4.83). German Offen 2446033 (dt. 15.4.76 assigned to Topchiev AV Institute of Petrochemical Synthesis) discloses copolymers based on vinyl-triorganosilanes with good permeation properties. The oxygen to nitrogen selectivities $\alpha=O_2/N_2$) of silicon containing polymers generally lie in the range from 2–5. Silicon containing polymers can be good candidates for processing into thin film composite membranes, e.g. Fr Demande 2293960 dt. 9.7.76 assigned to Societe de Usines Chimiques Rhone-Poulenc.

Figure 1:
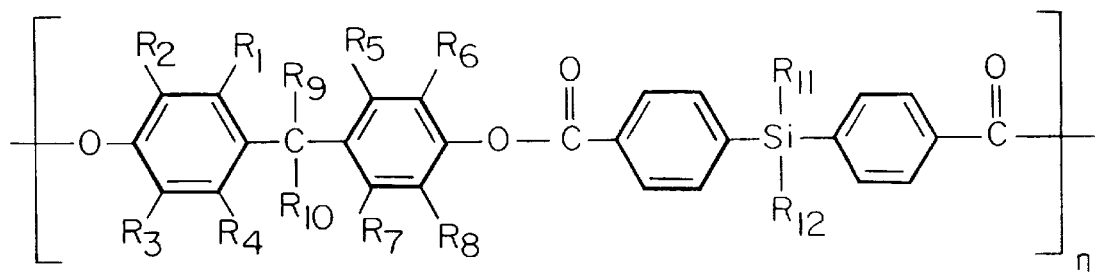
FIGS. 1 and 4 show the formula of the silicon containing polyarylates.

The present invention provides a new class of silicon containing polyarylates shown in FIG. 1 of the drawings accompanying this specification where $R_1$–$R_8$ represent Hydrogen or alkyl groups containing 1 to 5 methylene group or halogen atoms, $R_9$ and $R_{10}$ represent alkyl groups containing 1 to 5 carbon atoms or $CF_3$ group and $R_{11}$ and $R_{12}$ represent alkyl groups with 1 to 5 carbon atoms or phenyl groups. These polyarylates have excellent permeation properties combined with good processibility for forming thin film composite membrane.

Figure 2:
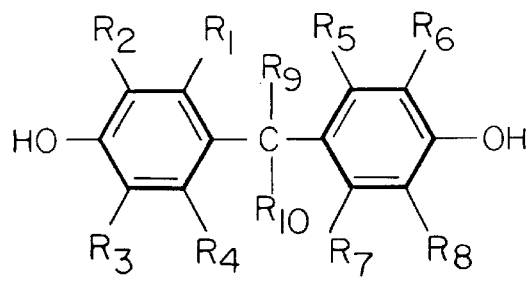
FIGS. 2 and 3 show the formula of the reactants used to produce the silicon containing polyarylates.
Figure 3:
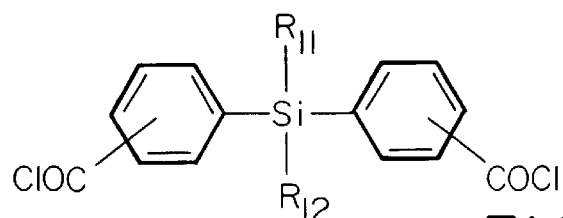

Further, the present invention provides a process for the preparation of silicon-containing polyarylates of the formula shown in FIG. 1 of the drawings accompanying this specification where $R_1$–$R_8$ represent Hydrogen or alkyl groups containing 1 to 5 methylene group or halogen atoms, $R_9$ and $R_{10}$ represent alkyl groups containing 1 to 5 carbon atoms or $CF_3$ group and $R_{11}$ and $R_{12}$ represents alkyl groups with 1 to 5 carbon atoms or phenyl groups, which comprises reacting the appropriate dihydric phenol of the FIG. 2 wherein $R_1$ to $R_{10}$ have the meanings given above with of bis (chlorocarbonyl phenyl)1,1 disubstituted silanes of the formula shown in FIG. 3 wherein $R_{11}$ and $R_{12}$ represent alkyl groups with 1 to 5 carbon atoms or phenyl groups.

These polyarylates are formed by reacting dihydric phenols with bis(chlorocarbonyl phenyl) 1, 1 disubstituted silanes. The dihydric phenols employed may be bisphenol-A, dimethyl bisphenol-A, bisphenol-S, tetramethyl bisphenol-A, orthocresolphthalein, and other substituted dihydric phenols having the formula shown in FIG. 2 where $R_1$–$R_8$ may be H, alkyl groups containing 1–5 methylene groups or halogen atoms. $R_9$ and $R_{10}$ can be alkyl groups containing 1–5 carbon atoms or $CF_3$ groups.

The bis(chlorocarbonyl phenyl)silanes can be represented as shown in FIG. 3 where the COCl group may be at ortho, para or meta positions and $R_{11}$ and $R_{12}$ can be alkyl groups with 1–5 carbon atoms or phenyl groups.

The silicon containing polyarylate is synthesised from the dihydric phenol and the diacid chloride by conventional techniques of interfacial or solution polymerisation. The polyarylate of the FIG. 1 prepared have an intrinsic viscosity in the range from 0.4–1.3 dl/g in chloroform.

The novel silicon containing polyarylates of the present invention are used for the preparation of semepermeable membranes useful for the separation of gases. Asymmetric membranes can be formed by phase inversion processing consisting of dissolving the polymer in an appropriate solvent, casting the solution in flat or tubular geometry, evaporating the solvent partially followed by immersion in another fluid which is a non solvent for the polymer but is miscible with the solvent. Appropriate solvents and non-solvents need to be found for membrane preparation.

Thin film composite membranes consist of a thin film of one polymer supported by a porous membrane substructure formed from a usually distinct second polymer. The thin film determines the overall separation and flux through the composite while the chief role of the porous structure is that of providing mechanical support to the thin film. The porous substrate is preferably formed from engineering polymers such as polysulfone, polyvinyledene fluoride polyimides, polyamides, polycarbonate or polyacrybuitrile. Formation of a thin film composite membrane for gas separation can be done by dip coating the porous substructure in a dilute solution of the first polymer. Solvent compatibility is necessary i.e. solvents need to be found which will dissolve the first polymer without dissolving or adversely affecting the second polymer. These polyarylates are easily processed into membrane form as they are soluble in a range of solvents such as but not limited to toluene, nitrobenzene, dioxane, methylethyl ketone, chloroform, tetrahydrofuran and dimethyl acetamide. Non solvents include water, methanol, ethanol, hexane iso-amylalcohol, dimethyl sulfoxide, cyclohexane, propanol.

The solutions of the polyarylate in these solvents can be used to form hollow fiber membranes or flat sheet membranes by phase inversion processing. Alternatively, the polyarylate can be formed into a thin film composite membrane form by dissolving it in a solvent such as toluene and then dip coating from this solution onto the surface of a porous membrane made from another polymer such as polyacrylonitrile or polyvinyledene fluoride which is not adversely affected by solvents such as toluene. Additives may be incorporated with the solvents or blends of solvents given above may be used to enhance membrane performance.

Furthermore, the present invention also provides a process for the preparation of semipermeable membranes useful for the separation of gases which comprises dissolving silicon containing polyarylates in organic solvents and forming a membrane by conventional methods.

Figure 4:
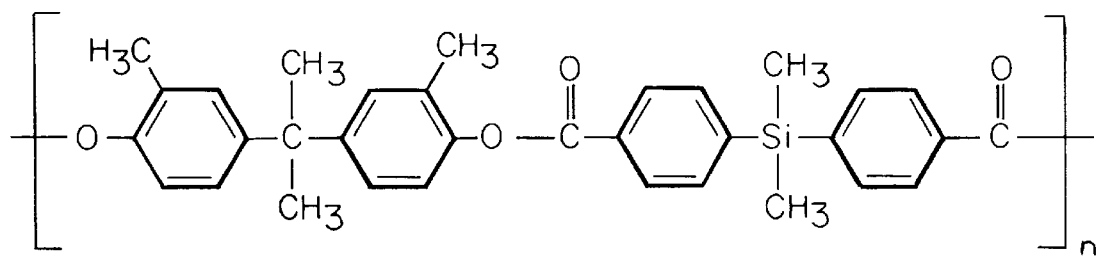

Membranes made of such silicon containing polyarylates have generally superior permeation properties for gas separations such as oxygen from nitrogen (Table 1). In particular the polyarylate with the structure shown in FIG. 4 has an excellent ideal separation factor for oxygen over nitrogen coupled with an adequately high intrinsic oxygen permeability.

Another aspect of the invention is to provide a process for the separation of a gas mixture by passing the gas mixture over the above described semipermeable membrane consisting of novel silicon-containing polyarylates defined above where this semipermeable membrane allows preferential transport of some components of the mixture.

The following examples will serve to illustrate the method of synthesis more specifically and should not be construed to limit the scope of the present invention.

EXAMPLE 1

Synthesis of polyarylate based on dimethyl Bisphenol A and Bis (4-chlorocarbonyl phenyl) 1,1 dimethyl silane:

In a 50 ml capacity, high speed stirring reactor flushed with nitrogen gas were dissolved 0.645 gms (0.0025 moles) of the dimethyl bisphenol-A and 16 mgms ($7 \times 10^{-5}$ moles) of benzyltriethyl ammonium chloride in 5 ml 1M sodium hydroxide solution. To this solution was added 0.812 gms (0.0025 moles) of bis(4-chlorocarbonyl phenyl) 1,1 dimethyl silane in 5 ml methylene chloride at 10° C. The reaction mixture was stirred for 30 min and then poured into an excess of methanol. The precipitated polymer was separated by filtration and washed with water. The polymer was further purified by dissolving it in chloroform, filtering and reprecipitating into methanol. The resultant precipitate was filtered under suction, and dried in vacuo to obtain 1.3 gms (99% yield) of pure polymer. The polymer had an intrinsic viscosity of 0.6 dl/g and a glass transition temperature $T_g$ of 206° C.

EXAMPLE 2

Synthesis of polyarylate based on tetramethyl Bisphenol A and Bis(4-chlorocarbonyl phenyl) 1,1 dimethyl silane:

In a 50 ml capacity, high speed stirring reactor flushed with nitrogen gas were placed 0.72 gms (0.0025 moles) of the tetramethyl bisphenol-A and 16 mgms ($7 \times 10^{-5}$ moles) of benzyltriethyl ammonium chloride in 5 ml 1M sodium hydroxide solution. To this solution was added 0.842 gms (0.0025 moles) of bis(4-chlorocarbonyl phenyl) 1,1 dimethyl silane in 5 ml methylene chloride at 10° C. The reaction mixture was stirred for 30 min and then poured into an excess of methanol. The precipitated polymer was separated by filtration and washed with water. This polymer was further purified by dissolving it in chloroform, filtering and reprecipitating into methanol. The resultant precipitate was filtered under suction, and dried in vacuo to obtain 1.36 gms (99% yield) of pure polymer. The polymer had an intrinsic viscosity of 0.65 dl/g and a glass transition temperature $T_g$ of 200° C.

EXAMPLE 3

Synthesis of polyarylate based on dimethyl bisphenol-A and Bis (4-chlorocarbonyl phenyl)1,1 diphenyl silane:

In a 50 ml capacity, high speed stirring reactor flushed with nitrogen gas were placed 0.322 gms (0.00125 moles) of the dimethyl bisphenol-A and 8 mgs ($3.5 \times 10^{-5}$ moles) of benzyltriethyl ammonium chloride in 2.5 ml 1M sodium hydroxide solution. To this solution was added 0.576 gms (0.00125 moles) of bis (4-chlorocarbonyl, phenyl) 1,1 diphenyl silane in 2.5 ml methylene chloride at 10° C. The reaction mixture was stirred for 30 min and then poured into an excess of methanol. The precipitated polymer was separated by filtration and washed with water. This polymer was further purified by dissolving it in chloroform, filtering and reprecipitating into methanol. the resultant precipitate was filtered under suction, and dried in vacuo to obtain 0.78 gms (98%yield) of pure polymer. The polymer had an intrinsic viscosity of 0,4 dl/g and a glass transition temperature $T_g$ of 223° C.

EXAMPLE 4

Permeability of polyarylate based on dimethyl Bisphenol-A and Bis (4-chlorocarbonyl phenyl) 1,1 dimethyl silane:

0.5 gm of this polymer was dissolved in 15 gm of chloroform after stirring for 12 hours. The solution was filtered and then poured into a flat bottomed petrie dish floating on mercury and covered with an aluminium foil with 2 pinholes. A film of 40 micron thickness was formed after the petrie dish was kept in a dry environment for 18 hrs at room temperature. The film was removed from the glass surface and put in a vacuum oven at 50°–60° C. for on week. It was then allowed to cool and mounted in a cell designed to measure gas permeation rates. At 35° C. and pressure differentials across the film corresponding to 150 psi/ambient pressure, the film had $N_2$ permeability of 0.15–0.2 Barrer $$\left( 1 \text{ Barrer} = 10^{-10} \frac{cm^3 \text{ (STP) cm}}{cm^2 \text{ sec cm Hg}} \right)$$

and an $O_2$ permeability of 1.2–1.7 Barrer. The $cm^2$ sec cm Hg selectivity ($O_2/N_2$) was 8.0–9.3.

EXAMPLE 5

Preparation of thin film composite membrane:

Polyacrylonitrile was dissolved in dimethyl formamide in amounts to make a 15% w/w solution. This solution was cast by knife coating on a web of a nonwoven polyester moving at a rate of 1.7 m/min and coagulated in water at 27° C. The resulting membrane had pores with the ability to retain 97% bovine serum albumin.

A solution comprising 1.0% of the polyarylate based on dimethyl Bisphenol A and Bis(4-chlorocarbonyl phenyl) 1,1 dimethyl silane was formed in toluene. The polyacrylonitrile membrane was taped to a glass plate and dipped in this toluene solution. A TFC membrane of the polyarylate supported by the polyacrylonitrile was formed. The thickness of the polyarylate was approximately 5000 A.

EXAMPLE 6

Permeability of conventional polyarylate based on dimethyl Bis-phenol A and 1:1 mixture of isophthalic and terephthalic acid chlorides:

0.5 gm. of this polymer prepared by conventional interfacial polycondensation (ref. PWJ Morgan, J. Polym. Sci., Polym. Chem. Ed., Vol. 2 pg 437 (1964) was dissolved in 15 gm of chloroform after stirring for 12 hours. The solution was filtered and then poured into a flat bottomed petrie dish floating on mercury and covered with an aluminium foil with 2 pinholes. The film of 40 micron thickness was formed after the petrie dish was kept in a dry environment for 18 hrs at room temperature. The film was removed from the glass surface and kept in a vacuum oven at 50°–60° C. for one week. It was then allowed to cool and mounted in a cell designed to measure gas permeation rates. At 35° C. and pressure differentials across the film corresponding to 150 psi/ambient pressure, the film had a $N_2$ permeability of 0.17 Barrer and an $O_2$ permeability of 0.5 Barrers. The selectivity ($\alpha=O_2/N_2$) was 2.8.

EXAMPLE 7

The procedure of Examples 4 and 6 were repeated with the substitution of dimethyl Bisphenol A with Bisphenol A. The polyarylate synthesised from Bisphenol A and bis(4-chlorocarbonyl phenyl)-1,1-dimethylsilane had an intrinsic viscosity of 0.4 dl/g and glass transition temperature of 203° C. The film formed from this polyarylate had a $N_2$ permeability of 0.63 and an $O_2$ permeability of 2.6 Barrer. The selectivity ($\alpha=O_2/N_2$) was 4.1. The control film formed from Bisphenol A and 50/50 isophthalic terephthalic acids had a $N_2$ permeability of 0.33 Barrers and an $O_2$ permeability of 1.4 Barrer. The selectivity ($\alpha=O_2/N_2$) was 4.2.

EXAMPLE 8

Permeabilities of polyarylate based on dimethyl Bisphenol A and Bis(4 chlorocarbonyl phenyl) 1,1 dimethyl silane:

0.5 gm of the polymer prepared as described above was dissolved in 15 gm of chloroform after stirring for 12 hours. The solution was filtered and then poured into a flat bottomed petrie dish floating on mercury and covered with an aluminium foil with 2 pinholes. The file of 40 micron thickness was formed after the petrie dish was kept in a dry environment for 18 hrs at room temperature. The film was removed from the glass surface and put in a vacuum oven at 50°–60° C. for one week. It was then allowed to cool and mounted in a cell designed to measure gas permeation rates. At 35° C. and pressure differentials across the film corresponding to 150 psi/ambient pressure, the film had $N_2$ permeability of 0.15–0.20 Barrer and an $O_2$ permeability of 1.2–1.7 Barrer. The selectivity ($\alpha=O_2/N_2$) was 8.0–9.3 thus making this a highly useful material to be formed into membranes for air separation processes as $O_2$ permeates through the membrane faster than $N_2$. This will allow separation of air into a $N_2$ rich stream and an $O_2$ rich stream. Permeabilities for several other gases are also indicated in Table showing other possible separations using membranes made from this polymer.

In examples 4 to 8, the unit of permeability used is the Barrer defined as $10^{-10}$ $^{CM^3}$(STP) cm/cm$^2$ Sec. cm Hg. The selectivity is the ratio of permeabilities for two gases.

TABLE 2

Permeability and selectivity for various gas pairs through polyarylate synthesised by dimethyl bisphenol-A and Bis(4-chlorocarbonylphenyl)1,1 dimethylsilane.

| Gas | Permeability Barrers | Gas Pairs | Selectivity |
|---|---|---|---|
| He | 16.5 | — | — |
| $N_2$ | 0.18 | He/$N_2$ | 91.3 |
| $O_2$ | 1.73 | $O_2$/$N_2$ | 9.5 |
| Ar | 0.70 | He/Ar | 23.6 |
| $CO_2$ | 6.8 | $CO_2$/$N_2$ | 37.6 |

*Measured at 35.0° C. and single gas pressures of 142–150 psi.

The main advantages of the invention are:

The class of polyarylates made from dihydric phenols and bis (carboxyphenyl)-1,1-disubstituted silanes have higher permeabilities in general than polyarylates made from the same dihydric phenols and conventional acids such as isophthalic or terephthalic acids. The polymer made from dimethyl bisphenol A and bis(carboxyphenyl)-1,1-dimethyl silane has a particularly advantageous combination of high oxygen to nitrogen selectivity combined with good oxygen permeability. Also the solubility characteristics of these polyarylates makes it convenient to form them into asymmetric or thin film composite membranes. With these intrinsic advantages membranes made from these polymers will be able to separate gases economically and with a greater degree of purification.

We claim:

1. A process for the preparation of semipermeable membranes useful for the separation of gases which comprises dissolving silicon-containing polyarylates in organic solvents and forming a membrane, wherein the silicon containing polyarylates comprise a repeating unit of Formula I:

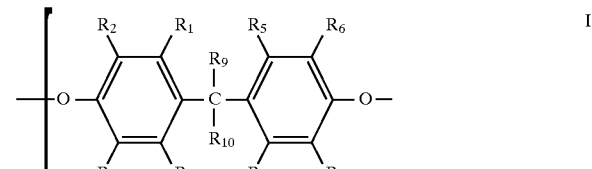

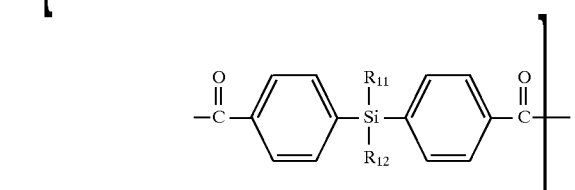

where $R_1$ to $R_8$ represent hydrogen, alkyl groups containing 1 to 5 carbon atoms or halogen atoms, $R_9$ and $R_{10}$ represents alkyl groups containing 1 to 5 carbon atoms or $CF_3$ group and $R_{11}$ and $R_{12}$ represent alkyl groups with 1 to 5 carbon atoms or phenyl groups.

2. A process as claimed in claim 1 wherein the organic solvent used is selected from ethers, aromatic hydrocarbons, halocarbons, esters or aprotic solvents.

3. A process as claimed in claim 1 wherein the formation of the membrane is effected by coating the solution of the silicon containing polyarylate on a supporting porous membrane formed from polyacrylonitrile, polyvinylidine fluoride, polysulfone or a polyolefin.

4. The process as claimed in claim 1 wherein the membrane comprises an asymetric membrane in one flat sheet or cylindrical geometries formed by a phase inversion method.

5. The process as claimed in claim 1 wherein the membrane comprises a thin-film composite membrane formed by a dip coating method.

6. A process for the preparation of semipermeable membranes useful for the separation of gases which comprises dissolving silicon-containing polyarylates in organic solvents and forming a membrane, wherein the silicon containing polyarylates comprise a repeating unit of Formula IV:

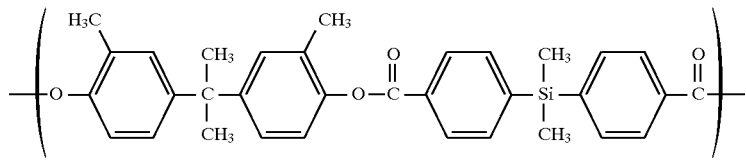

IV

7. The process as claimed in claim 6 wherein the membrane comprises an asymetric membrane in one flat sheet or cylindrical geometries formed by a phase inversion method.

8. The process as claimed in claim 6 wherein the membrane comprises a thin-film composite membrane formed by a dip coating method.

9. A process for the separation of gases which comprises passing the gases over a semipermeable membrane comprising silicon containing polyarylates comprising a repeating unit of Formula I:

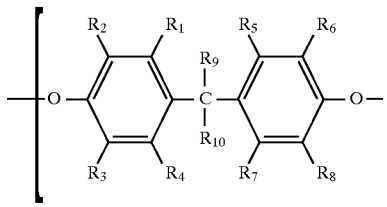

I

-continued

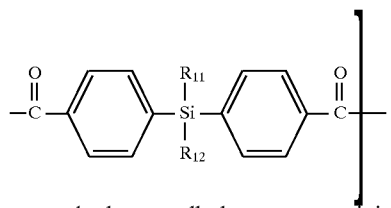

where $R_1$ to $R_8$ represent hydrogen, alkyl groups containing 1 to 5 carbon atoms or halogen atoms, $R_9$ and $R_{10}$ represents alkyl groups containing 1 to 5 carbon atoms or $CF_3$ group and $R_{11}$ and $R_{12}$ represent alkyl groups with 1 to 5 carbon atoms or phenyl groups.

10. A process as claimed in claim 9 wherein the gases to be separated consisted of a mixture of oxygen and nitrogen.

* * * * *